(12) United States Patent
Grefenstein et al.

(10) Patent No.: US 6,589,378 B2
(45) Date of Patent: Jul. 8, 2003

(54) PROCESS FOR PRODUCING LAMINATED SHEETS OR FILMS AND MOLDINGS HAVING UV-STABILITY AND THERMAL AGING RESISTANCE

(75) Inventors: Achim Grefenstein, Altrip (DE); Gerhard Lindenschmidt, Leimen (DE); Carsten Netze, Heidelberg (DE); Doris Zeltner, Römerberg (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/885,358

(22) Filed: Jun. 21, 2001

(65) Prior Publication Data

US 2002/0045056 A1 Apr. 18, 2002

Related U.S. Application Data

(62) Division of application No. 08/987,775, filed on Dec. 9, 1997.

(30) Foreign Application Priority Data

Dec. 10, 1996 (DE) .......................................... 196 51 350
Jun. 17, 1997 (DE) .......................................... 197 25 560

(51) Int. Cl.$^7$ ............................................... B32B 31/00
(52) U.S. Cl. ...................... 156/222; 156/243; 156/280; 525/71
(58) Field of Search ................................ 156/243, 222, 156/280; 525/71

(56) References Cited

U.S. PATENT DOCUMENTS

| | | | |
|---|---|---|---|
| 3,447,997 A | * | 6/1969 | Kamal ........................ 156/243 |
| 4,107,235 A | | 8/1978 | DeWitt, III |
| 4,403,003 A | | 9/1983 | Backhouse |
| 4,420,451 A | | 12/1983 | Rasmussen |
| 4,467,969 A | | 8/1984 | Godfrey et al. |
| 5,037,680 A | | 8/1991 | Papendick et al. |
| 5,192,609 A | | 3/1993 | Carroll, Jr. |
| 5,196,480 A | * | 3/1993 | Seitz et al. ................... 525/71 |
| 5,215,811 A | | 6/1993 | Reafler et al. |
| 5,271,968 A | | 12/1993 | Coyle et al. |
| 5,279,883 A | | 1/1994 | Leca et al. |
| 5,318,737 A | | 6/1994 | Trabert et al. |
| 5,688,449 A | | 11/1997 | Fox |
| 5,747,568 A | | 5/1998 | Fischer et al. |
| 5,773,139 A | | 6/1998 | Ogura et al. |
| 5,795,936 A | | 8/1998 | Lin et al. |
| RE35,894 E | | 9/1998 | Ellison et al. |
| 5,821,302 A | | 10/1998 | Rosenau et al. |
| 5,851,463 A | | 12/1998 | Guntherberg et al. |
| 5,858,550 A | | 1/1999 | Tsai et al. |
| 5,877,258 A | * | 3/1999 | Guntherberg et al. ......... 525/71 |
| 5,985,079 A | | 11/1999 | Ellison |

FOREIGN PATENT DOCUMENTS

| | | |
|---|---|---|
| EP | 0060421 A1 | 2/1982 |
| EP | 225 500 | 6/1987 |
| EP | 361 823 | 4/1990 |
| EP | 522 240 | 11/1996 |
| WO | 96/09928 | 4/1996 |

OTHER PUBLICATIONS

Kuststoffe, 86 (1996), p. 388–392. Not translated.
Plastics World, Jul. 1996, p. 48–52, No particular relevance.

* cited by examiner

Primary Examiner—Jeff H. Aftergut
(74) Attorney, Agent, or Firm—Keil & Weinkauf

(57) ABSTRACT

A process for producing a UV-stable laminated structure having thermal aging resistance includes coextruding the following layers in a single-stage operation, or laminating the following layers onto one another in a heatable roll nip:

a substrate layer made up of a graft copolymer and a styrene and/or (meth)acrylate/(meth)acrylonitrile copolymer, and optionally containing a polycarbonate and a fibrous and/or particulate filler; and a transparent top layer of polymethyl methacrylate.

In another embodiment, an interlayer of e.g., impact-modified polymethyl methacrylate or polycarbonate, is coextruded or laminated between the transparent top layer and the substrate layer to produce a UV-stable laminated structure. An adhesion layer containing an adhesion promoter can be coextruded or laminated on the outer surface of the substrate layer.

A molding is produced by thermoforming the UV-stable laminated structure, which is advantageously backsprayed or back-cast with the substrate layer or a polyurethane foam. The molding can take the form of an automotive exterior bodywork component.

16 Claims, No Drawings

PROCESS FOR PRODUCING LAMINATED SHEETS OR FILMS AND MOLDINGS HAVING UV-STABILITY AND THERMAL AGING RESISTANCE

This application is a divisional application of Ser. No. 08/987,775, filed Dec. 9, 1997, pending.

BACKGROUND OF THE INVENTION

1. Field of the Invention

The invention relates to laminated sheets or films, to processes for their production, to their use for producing moldings, to processes for producing the moldings and to moldings thereof.

2. Description of the Related Art

When plastics are used outdoors where they are subjected to weathering and, in particular, to UV radiation, high standards are required in terms of UV stability and weatherability. Especially when they are used in exterior bodywork parts in the automotive sector, high requirements are also set for other mechanical properties, such as the low-temperature impact strength, as well as for the visual quality. The processes and materials employed at present do not always meet these conditions.

Bodywork parts made from plastics are, for example, topcoated or mass-colored and clearcoated. Topcoating in this case requires high heat deformation resistance, which is a requirement met by only a few plastics. Mass coloring, especially using special-effect pigments, is very costly and in many cases lessens the mechanical properties of the substrate.

Instead of spray coating it is possible to use other coating processes, such as the backspraying technology. In this, coating films are produced by roller coating or intaglio printing processes and are backsprayed or backmolded with support materials.

J. H. Schut in Plastics World, July 1996, pages 48 to 52 describes the use of such coating films in the production of automotive components. Polyvinylidene fluoride films and polyvinyl fluoride films are described which are employed in conjunction with ABS as substrates. Polyvinylidene fluoride/acrylate films are also mentioned. Thermoplastic olefins can also be employed as substrates. Production techniques specified are thermoforming, thermoforming in conjunction with injection molding, and injection molding alone.

EP-B1-0 361 823 describes films of this kind which consist of fluoro polymers or mixtures thereof with acrylates. They are backmolded with curable, filler-reinforced polyester compositions. The layers can also comprise acrylonitrile-butadiene-styrene (ABS) copolymers.

To date, all known backspraying films have been used only for effect finishes and multicolored decoration, since the films are very costly.

U.S. Pat. No. 5,192,609 describes coating films for the roller coating of a thermoplastic support material. Films with up to six layers are applied to a substrate. Besides polyolefins, the substrates mentioned include ABS and polyvinyl chloride.

The topmost layer used is a clear coating which consists of a polymeric, crosslinkable two-component mixture, based for example on polyols.

EP-B-0 522 240 describes multilayer polymer film laminates which have a top layer based on polyvinylidene fluoride or polymethyl methacrylate and a substrate comprising a polyolefin. The coextrusion of the top layer with subsequent extrusion-coating with the support material or further layers is described.

Another known bodywork material comprises coextruded sheets of polymethyl methacrylate (PMMA) and ABS. For example H. Kappacher, in Kunststoffe 86 (1996), pp. 388 to 392, describes coextruded PMMA/ABS laminated sheets. The bodywork parts are produced by coextrusion through a slot die to form sheets, which are subsequently thermoformed. In some applications, however, the thermal aging resistance of the ABS is inadequate. In order to protect the ABS or ABS/PC against UV light it is necessary to employ relatively thick UV-absorbing PMMA top layers. The impact strength can also be inadequate, lessened as it is by the brittle PMMA top layer. Furthermore, the surface gloss decreases sharply at draw ratios of 1:2 and above.

The coextrusion process using a slot die is described, for example, in EP-A2-0 225 500.

It is an object of the present invention to provide laminated sheets or films and moldings thereof which are of superior UV stability and thermal aging resistance as compared with known sheets, films or moldings. Moreover, high draw ratios should be possible without detriment to the surface gloss. It should be possible to produce the moldings at favorable cost. The products, furthermore, should be of enhanced elongation at break, low-temperature impact strength and scratch resistance and of increased penetration resistance.

We have found that this object is achieved in accordance with the invention by means of laminated sheets or films comprising (1) a substrate layer comprising—based on the sum of the amounts of components A and B and, if used, C and/or D, which totals 100% by weight— a 1–99% by weight of a graft copolymer of a1 1–99% by weight of a particulate graft base A1 comprising the following monomers:

a11 80–99.99% by weight of at least one $C_{1-8}$-alkyl ester of acrylic acid as component A11, a12 0.01–20% by weight of at least one polyfunctional crosslinking monomer as component A12;

a2 1–99% by weight of a graft A2 comprising the following monomers, based on A2:

a21 40–100% by weight of units of styrene, a substituted styrene or a (meth)acrylate, or mixtures thereof, as component A21 and a22 up to 60% by weight of units of acrylonitrile or methacrylonitrile as component A22;

the graft A2 consisting of at least one graft shell and the graft copolymer having a mean particle size of 50–1000 nm, as component A, b 1–99% by weight of a copolymer of b1 40–100% by weight of units of styrene, a substituted styrene or a (meth)acrylate, or mixtures thereof, as component B1, b2 up to 60% by weight of acrylonitrile or methacrylonitrile as component B2, as component B, c 0–80% by weight of polycarbonates as component C, and d 0–50% by weight of fibrous or particulate fillers or mixtures thereof as component D, and (3) a transparent top layer of polymethyl methacrylate.

The object is also achieved by laminated films comprising, in this order, (1') a substrate layer comprising a molding compound of component (1) as described above, ABS, polycarbonate, polybutylene terephthalate, polyethylene terephthalate, polyamide, polyetherimide, polyether ketone, polyphenylene sulfide, polyphenylene ether or blends thereof, having a layer thickness of from 90 to 990 μm, (3') a transparent top layer comprising polymethyl methacrylate (PMMA), high-impact polymethyl methacrylate (HI-PMMA), ABS, polycarbonate (PC), polyethylene terephthalate (PET), styrene-acrylonitrile copolymers (SAN), polyamide (PA), polyether sulfone (PES) or polysulfone (PSU), having a layer thickness of from 10 to 100 μm, it being possible for the substrate layer to comprise colorants and comprising them if the substrate layer and the top layer are composed of the same molding compounds, and the overall thickness of the laminated film being from 100 to 1000 μm.

The novel laminated sheets or films and also the moldings produced therefrom are of better penetration resistance and/or low-temperature impact strength, scratch resistance and elongation at break than the known sheets, films and moldings and have better drawing properties with constant surface gloss. They are therefore particularly suitable for exterior use, where they are subject to UV radiation and the effects of weather. Use in the automotive sector is particularly appropriate.

The individual layers and components of the laminated sheets or films are described below.

Layer (1)

Layer (1) is composed of the following components A and B and, if used, C and/or D, which total to 100% by weight.

Component A is a graft copolymer of a1 1–99% by weight, preferably 55–80% by weight, in particular 55–65% by weight, of a particulate graft base A1 having a glass transition temperature of below 0° C., a2 1–99% by weight, preferably 20–45% by weight, in particular 35–45% by weight, of a graft A2 comprising the following monomers, based on A2:

a21 40–100% by weight, preferably 65–85% by weight, of units of styrene, a substituted styrene or a (meth)acrylate or mixtures thereof, especially of styrene and/or α-methylstyrene, as component A21, and a22 up to 60% by weight, preferably 15–35% by weight, of units of acrylonitrile or methacrylonitrile, especially acrylonitrile, as component A22.

The graft A2 here consists of at least one graft shell, the graft copolymer A overall having a mean particle size of 50–1000 nm.

Component A1 consists of the following monomers:

a11 80–99.99% by weight, preferably 95–99.9% by weight, of at least one $C_{1-8}$-alkyl ester of acrylic acid, preferably n-butyl acrylate and/or ethylhexyl acrylate, as component A11, a12 0.01–20% by weight, preferably 0.1–5.0% by weight, of at least one polyfunctional crosslinking monomer, preferably diallyl phthalate and/or DCPA, as component A12.

In one embodiment of the invention the mean particle size of component A is 50–800 nm, preferably 50–600 nm.

In another novel embodiment the particle-size distribution of component A is bimodal, 60–90% by weight of the particles having a mean size of 50–200 nm and 10–40% by weight having a mean size of 50–400 nm, based on the overall weight of component A.

The mean particle size and particle-size distribution indicated comprise the figures determined from the integral mass distribution. In the case of the mean particle sizes according to the invention the figure is in all cases the weight-average particle size as determined by means of an analytical ultracentrifuge in accordance with the process of W. Scholtan and H. Lange, Kolloid-Z. und Z.-Polymere 250 (1972), 782–796. The ultracentrifuge measurement gives the integral mass distribution of the particle diameter of a sample. From this it is possible to derive what percentage of the particles, by weight, has a diameter equal to or less than a certain size. The mean particle diameter, also referred to as the $d_{50}$ value of the integral mass distribution, is defined as that particle diameter below which lie 50% by weight of the particles. At that point, 50% by weight of the particles also have a greater diameter than the $d_{50}$ value. The breadth of the particle-size distribution of the rubber particles is characterized using not only the $d_{50}$ value (mean particle diameter) but also the $d_{10}$ and $d_{90}$ values resulting from the integral mass distribution. The $d_{10}$ and $d_{90}$ values of the integral mass distribution are defined as for the $d_{50}$ value with the difference that they are related to 10 and 90% by weight, respectively, of the particles. The quotient $$\frac{d_{90} - d_{10}}{d_{50}} = Q$$

is a measure of the breadth of distribution (scatter) of the particle size. For emulsion polymers A which can be used in accordance with the invention as component A, Q is preferably less than 0.5, in particular less than 0.35.

The acrylate rubbers A1 are preferably alkyl acrylate rubbers comprising one or more $C_{1-8}$-alkyl acrylates, preferably $C_{4-8}$-alkyl acrylates, using preferably—at least in part—butyl, hexyl, octyl or 2-ethylhexyl acrylate, especially n-butyl and 2-ethylhexyl acrylate. Up to 30% by weight of these alkyl acrylate rubbers can comprise, in copolymerized form, monomers which form hard polymers, such as vinyl acetate, (meth)acrylonitrile, styrene, substituted styrene, methyl methacrylate and vinyl ethers.

The acrylate rubbers additionally include 0.01–20% by weight, preferably 0.1–5% by weight, of polyfunctional monomers having a crosslinking action (crosslinking monomers). Examples thereof are monomers containing 2 or more copolymerizable double bonds, which are preferably not 1,3-conjugated.

Examples of suitable crosslinking monomers are divinylbenzene, diallyl maleate, diallyl fumarate, diallyl phthalate, diethyl phthalate, triallyl cyanurate, triallyl isocyanurate, tricyclodecenyl acrylate, dihydrodicyclopentadienyl acrylate, triallyl phosphate, allyl acrylate and allyl methacrylate. A crosslinking monomer which has proven particularly favorable is dicyclopentadienyl acrylate (DCPA; cf. DE-C 12 60 135).

Component A is a graft copolymer. The graft copolymers A have a mean particle size $d_{50}$ of 50–1000 nm, preferably 50–800 nm and, with particular preference, 50–600 nm. Such particle sizes can be obtained by using a graft base A1 of this component A having particle sizes of 50-350 nm, preferably 50–300 nm and, with particular preference, 50-250 nm.

The graft copolymer A is generally a single- or multistage polymer, i.e. a polymer composed of a core and of one or more shells. The polymer consists of a base stage (graft core) A1 and of one or—preferably—more stages A2 (graft) grafted thereon, called the graft stages or graft shells.

By single grafting or multiple, stepwise grafting it is possible to apply one or more graft shells to the rubber particles, it being possible for each graft shell to have a different composition. In addition to the grafting monomers, polyfunctional, crosslinking monomers or monomers containing reactive groups can also be grafted on (see for example EP-A 230 282, DE-B 36 01 419, EP-A 269 861).

In a preferred embodiment, component A consists of a multistage graft copolymer, the graft stages being produced generally from resin-forming monomers and having a glass transition temperature $T_g$ of more than 30° C., preferably more than 50° C. The purpose of the multistage structure is, inter alia, to obtain (partial) compatibility of the rubber particles A with the thermoplastic B.

Graft copolymers A are produced, for example, by grafting at least one of the monomers A2 listed below onto at least one of the graft bases or graft core materials A1 listed above.

According to one embodiment of the invention, the graft base A1 is composed of 15–99% by weight of acrylate rubber, 0.1–5% by weight of crosslinker and 0–49.9% by weight of one of the other monomers or rubbers indicated.

Monomers suitable for forming the graft A2 are styrene, α-methylstyrene, (meth)acrylates, acrylonitrile and methacrylonitrile, especially acrylonitrile.

According to one embodiment of the invention, crosslinked acrylate polymers having a glass transition temperature of below 0° C. are used as the graft base A1. The crosslinked acrylate polymers should preferably have a glass transition temperature of below −20° C., in particular below −30° C.

In one preferred embodiment the graft A2 consists of at least one graft shell and the outermost graft shell thereof has a glass transition temperature of more than 30° C., where a polymer formed from the monomers of the graft base A2 would have a glass transition temperature of more than 80° C.

Suitable production processes for graft copolymers A are emulsion, solution, bulk or suspension polymerization. The graft copolymers A are preferably produced by free-radical emulsion polymerization in the presence of lattices of component A1 at temperatures of 20° C.–90° C. using water-soluble or oil-soluble initiators, such as peroxodisulfate or benzyl peroxide, or with the aid of redox initiators. Redox initiators are also suitable for polymerization below 20° C.

Appropriate emulsion polymerization processes are described in DE-A 28 26 925 and 31 49 358 and in DE-C 12 60 135.

The synthesis of the graft shells takes place preferably by the emulsion polymerization process, as is described in DE-A 32 27 555, 31 49 357, 31 49 358, 34 14 118. Defined establishment of the particle sizes of 50–1000 nm according to the invention is preferably effected in accordance with the processes described in DE-C 12 60 135 and DE-A 28 26 925, or Applied Polymer Science, Volume 9 (1965), page 2929. The use of polymers having different particle sizes is known, for example, from DE-A 28 26 925 and U.S. Pat. No. 5,196,480.

According to the process described in DE-C 12 60 135 the graft base A1 is first of all produced by polymerizing the acrylate or acrylates used in accordance with one embodiment of the invention and the polyfunctional, crosslinking monomer, alone or together with the other comonomers, in an aqueous emulsion in a manner known per se at from 20 to 100° C., preferably from 50 to 80° C. The customary emulsifiers can be used, for example alkali metal salts of alkyl- or alkylarylsulfonic acids, alkyl sulfates, fatty alcohol sulfonates, salts of higher fatty acids having 10 to 30 carbons, or resin soaps. Use is preferably made of the sodium salts of alkylsulfonates or fatty acids of 10 to 18 carbons. In one embodiment the emulsifiers are employed in amounts of 0.5–5% by weight, in particular 1–2% by weight, based on the monomers that are employed for producing the graft base A1. It is usual to operate with a weight ratio of water to monomers of from 2:1 to 0.7: 1. Polymerization initiators used are, in particular, the customary persulfates, such as potassium persulfate. It is also possible, however, to employ redox systems. The initiators are generally employed in amounts of 0.1–1% by weight, based on the monomers that are employed in producing the graft base A1. Further polymerization auxiliaries used can be the customary buffer substances by means of which pH values of preferably 6–9 are established, such as sodium bicarbonate and sodium pyrophosphate, and also 0–3% by weight of a molecular weight regulator, such as mercaptans, terpinols or dimeric α-methylstyrene.

The precise polymerization conditions, especially the nature, rate of addition and amount of the emulsifier, are determined within the ranges set out above and specifically in such a way that the resulting latex of the crosslinked acrylate polymer has a $d_{50}$ value in the range of about 50–1000 nm, preferably 50–600 nm, and with particular preference, in the range of 80–500 nm. The particle-size distribution of the latex should preferably be narrow.

Then, to produce the graft polymer A, according to one embodiment of the invention a monomer mixture of styrene and acrylonitrile is polymerized in a subsequent step in the presence of the resultant latex of the crosslinked acrylate polymer, the weight ratio of styrene to acrylonitrile in the monomer mixture being—in accordance with one embodiment of the invention—in the range from 100:0 to 40:60, preferably in the range from 65:35 to 85:15. It is advantageous to carry out this graft copolymerization of styrene and acrylonitrile onto the crosslinked polyacrylate polymer, used as graft base, again in aqueous emulsion under the customary conditions described above. The graft copolymerization can judiciously be effected in the same system as the emulsion polymerization for producing the graft base A1, with the possible addition if required of further emulsifier and initiator. The monomer mixture of styrene and acrylonitrile which is to be engrafted in accordance with one embodiment of the invention can be added to the reaction mixture all at once, in stages in a number of portions or, preferably, continuously during the polymerization. The graft copolymerization of the mixture of styrene and acrylonitrile in the presence of the crosslinking acrylate polymer is conducted so as to give a degree of grafting of 1–99% by weight, preferably 20–45% by weight, especially 35–45% by weight, based on the overall weight of component A, in the graft copolymer A. Since the grafting yield in the graft copolymerization is not 100%, it is necessary in the graft copolymerization to employ a somewhat larger amount of the monomer mixture of styrene and acrylonitrile than that corresponding to the desired degree of grafting. Control of the grafting yield in graft copolymerization and thus of the degree of grafting of the finished graft copolymer A is familiar to the skilled worker and can be done by playing, inter alia, on parameters such as the metering rate of the monomers or the addition of regulator (Chauvel, Daniel, ACS Polymer Preprints 15 (1974), page 329 ff.). The emulsion graft copolymerization generally produces about 5–15% by weight, based on the graft copolymer, of free, ungrafted styrene/acrylonitrile copolymer. The proportion of the graft copolymer A in the polymerization product obtained in the graft copolymerization is determined by the method indicated above.

In the case of the production of graft copolymers A by the emulsion process, in addition to the given process advantages, reproducible changes in particle size are also possible, for example by at least partial agglomeration of the particles to form larger particles. This means that in the graft copolymers A it is also possible for there to be polymers having different particle sizes.

In particular, component A comprising graft base and graft shell(s) can be optimized for the particular intended application, especially in terms of the particle size.

The graft copolymers A generally contain 1–99% by weight, preferably 55–80 and, with particular preference, 55–65% by weight of graft base A1 and 1–99% by weight, preferably 20–45 and, with particular preference, 35–45% by weight of the graft A2, based in each case on the graft copolymer as a whole.

Component B

Component B is a copolymer comprising b1 40–100% by weight, preferably 60–85% by weight, of units of styrene, a substituted styrene or a (meth) acrylate or mixtures thereof, especially of styrene and/or α-methylstyrene, as component B1, b2 up to 60% by weight, preferably 15–40% by weight, of units of acrylonitrile or methacrylonitrile, especially of acrylonitrile, as component B2.

In accordance with a preferred embodiment of the invention, the viscosity number of component B is 50–90, preferably 60–80.

Component B is preferably an amorphous polymer as described above as graft A2. In one embodiment of the invention a copolymer of styrene and/or α-methylstyrene with acrylonitrile is used as component B. The acrylonitrile content of these component B copolymers is 0–60% by weight, preferably 15–40% by weight, based on the overall weight of component B. Component B also embraces the free, ungrafted styrene-acrylonitrile copolymers that are formed in the course of the graft copolymerization for producing component A. Depending on the conditions chosen for the graft copolymerization for producing the graft copolymer A it may be possible for a sufficient amount of component B to be formed during the graft copolymerization itself. In general, however, it will be necessary to blend the products obtained in the graft copolymerization with additional, separately produced component B.

This additional, separately produced component B can preferably be a styrene/acrylonitrile copolymer, an α-methylstyrene-acrylonitrile copolymer or an α-methylstyrene-styrene-acrylonitrile terpolymer. These copolymers can be employed individually or else as a mixture for component B, so that the additional, separately produced component B may, for example, comprise a mixture of a styrene-acrylonitrile copolymer and of an α-methylstyrene-acrylonitrile copolymer. Where component B consists of a mixture of a styrene-acrylonitrile copolymer and of an α-methylstyrene-acrylonitrile copolymer, the acrylonitrile contents of the two copolymers preferably should not differ by more than 10% by weight, particularly preferably by not more than 5% by weight, based on the overall weight of the copolymer. Component B may, however, alternatively consist of only one single styrene-acrylonitrile copolymer, if the same monomer mixture of styrene and acrylonitrile was used as the starting material in the graft copolymerizations for producing component A and in the production of the additional, separately produced component B.

The additional, separately produced component B can be obtained by the conventional processes. Thus, according to one embodiment of the invention, the styrene and/or α-methylstyrene can be copolymerized with the acrylonitrile in bulk, solution, suspension or aqueous emulsion. Component B preferably has a viscosity number of from 40 to 100, more preferably from 50 to 90 and in particular from 60 to 80. This viscosity number is determined in accordance with DIN 53 726, dissolving 0.5 g of material in 100 ml of dimethylformamide.

The mixing of components A and B and, if used, C, D can be performed in any desired manner by any known process. If components A and B have been produced, for example, by emulsion polymerization it is possible to mix the resulting polymer dispersions with one another, then to precipitate the polymers jointly and to work up the polymer mixture. Preferably, however, the blending of components A and B is done by conjoint extrusion, kneading or rolling of the components, the latter having been isolated if necessary beforehand from the aqueous dispersion or solution obtained in the polymerization. The graft copolymerization products (component A) obtained in aqueous dispersion can also be only partially dewatered and can be mixed in the form of moist crumbs with component B, complete drying of the graft copolymers then taking place in the course of mixing.

In a preferred embodiment component (1) comprises, in addition to components A and B, additional components C and/or D, with or without other additives, as described below.

Component C

Suitable polycarbonates C are known per se. They preferably have a molecular weight (weight mean value $M_W$, determined by gel permeation chromatography in tetrahydrofuran against polystyrene standards) in the range from 10,000 to 60,000 g/mol. They are obtainable, for example, by the processes of DE-B-1 300 266 by interfacial polycondensation or by the process of DE-A-1 495 730 by reacting diphenyl carbonate with bisphenols. A preferred bisphenol is 2,2-di(4-hydroxyphenyl)propane, which is referred to generally—and below—as bisphenol A.

Instead of bisphenol A it is also possible to use other aromatic dihydroxy compounds, especially 2,2-di(4-hydroxyphenyl)pentane, 2,6-dihydroxynaphthalene, 4,4'-dihydroxydiphenyl sulfone, 4,4'-dihydroxydiphenyl ether, 4,4'-dihydroxydiphenyl sulfide, 4,4'-dihydroxydiphenylmethane, 1,1-di(4-hydroxyphenyl)ethane, 4,4'-dihydroxybiphenyl or dihydroxydiphenylcycloalkanes, preferably dihydroxydiphenylcyclohexanes or dihydroxyphenylcyclopentanes, especially 1,1-bis(4-hydroxyphenyl)-3,3,5-trimethylcyclohexane, and also mixtures of the abovementioned dihydroxy compounds.

Particularly preferred polycarbonates are those based on bisphenol A or on bisphenol A together with up to 80 mol % of the abovementioned aromatic dihydroxy compounds.

It is also possible to use copolycarbonates according to U.S. Pat. No. 3,737,409; of particular interest in this context are copolycarbonates based on bisphenol A and di(3,5-dimethyldihydroxyphenyl) sulfone, which are notable for high heat deformation resistance. It is also possible to employ mixtures of different polycarbonates.

The average molecular weights (weight mean value $M_W$, determined by gel permeation chromatography in tetrahydrofuran against polystyrene standards) of the polycarbonates C are, in accordance with the invention, in the range from 10,000 to 64,000 g/mol. They are preferably in the range from 15,000 to 63,000, in particular in the range from 15,000 to 60,000 g/mol. This means that the polycarbonates C have relative solution viscosities in the range from 1.1 to 1.3, measured in 0.5% strength by weight solution in dichloromethane at 25° C., preferably from 1.15 to 1.33. The relative solution viscosities of the polycarbonates employed preferably differ by not more than 0.05, in particular not more than 0.04.

The polycarbonates C can be employed either in ground or in granulated form. As component C they are present in amounts of 0–50% by weight, preferably of 10–40% by weight, based in each case on the overall molding composition.

The addition of polycarbonates leads inter alia to greater thermal stability and improved crack resistance of the sheets, films and moldings.

Component D

As component D, component (1) comprises 0–50% by weight, preferably 0–40% by weight, and in particular, 0–30% by weight of fibrous or particulate fillers or mixtures thereof, based in each case on component 1 as a whole. These are preferably products which are available commercially.

Reinforcing materials such as carbon fibers and glass fibers are commonly used in amounts of 5–50% by weight, based on component (1) as a whole.

The glass fibers used can be of E, A or C glass and are preferably already treated with a size and with an adhesion promoter. Their diameter is in general from 6 to 20 µm. It is possible to employ both continuous fibers (rovings) and cut glass fibers (staple) with a length of 1–10 µm, preferably 3–6 µm.

It is also possible to add fillers or reinforcing materials such as glass beads, mineral fibers, whiskers, alumina fibers, mica, quartz flour and wollastonite.

Other possibilities for addition are metal flakes (e.g. aluminum flakes from Transmet Corp.), metal powders, metal fibers, metal-coated fillers, for example nickel-coated glass fibers, and other additives which screen against electromagnetic waves. Particularly suitable are aluminum flakes (K 102 from Transmet) for EMI (electro-magnetic interference) purposes. The compositions can also be mixed with additional carbon fibers, carbon black, especially conductivity black, or nickel-coated C fibers.

The component (1) used in accordance with the invention may, furthermore, include further additives which are customary and typical for polycarbonates, SAN polymers and graft copolymers or mixtures thereof. Examples which may be mentioned of such additives are dyes, pigments, colorants, antistatics, antioxidants, stabilizers for enhancing the thermal stability, for increasing the light stability, for raising the resistance to hydrolysis and the chemical resistance, heat stabilizers, and especially the lubricants that are judicious for the production of shaped articles and moldings. The addition of these further additives can take place at any stage in the production process, but they are preferably added early on so as to allow for early exploitation of the stabilizing effects (or other special effects) of the additive. Heat stabilizers and antioxidants are usually metal halides (chlorides, bromides, iodides) derived from metals of group I of the Periodic Table of the Elements (such as Li, Na, K, Cu).

Appropriate stabilizers are the customary hindered phenols, but also vitamin E and compounds of analogous structure. Also suitable are HALS (hindered amine light stabilizers), benzophenones, resorcinols, salicylates, benzotriazoles such as Tinuvin® P (UV absorber 2-(2H-benzotriazol-2-yl)-4-methylphenol from CIBA) and other compounds. They are usually used in amounts of up to 2% by weight (based on the overall mixture).

Suitable lubricants and mold release agents are stearic acids, stearyl alcohol, stearic esters and, generally, higher fatty acids, their derivatives and corresponding fatty acid mixtures having 12–30 carbon atoms. The amounts of these additives are in the range 0.05–1% by weight.

Other suitable additives are silicone oils, oligomeric isobutylene or similar substances, with customary amounts being 0.05–5% by weight. It is likewise possible to use pigments, dyes, optical brighteners, special-effect colorants, such as titanium dioxide, carbon black, iron oxides, phthalocyanines, quinacridones, perylenes, anthraquinones, and aluminum spangles.

Processing aids and stabilizers such as UV stabilizers, lubricants and antistatics are commonly used in amounts of 0.01–5% by weight.

Component (1) can be produced by processes known per se, by mixing the components. It may be advantageous to premix certain components. Also possible is the mixing of the components in solution and removal of the solvents.

Examples of suitable organic solvents are chlorobenzene, mixtures of chlorobenzene and methylene chloride or mixtures of chlorobenzene or aromatic hydrocarbons, for example toluene.

The solvent mixtures can be evaporated, for example, in evaporative extruders.

The dry components, for example, can be mixed by any known method. Mixing is preferably effected, however, by conjoint extrusion, kneading or rolling of the components, preferably at 180–400° C., the components having been isolated beforehand if necessary from the solution obtained during the polymerization or from the aqueous dispersion.

In this context, the components can be added together or separately/in succession.

In the novel laminated films layer (1') is a substrate layer which comprises a molding compound of component (1) as described above, ABS, polycarbonate, polybutylene terephthalate (PBT), polyethylene terephthalate, polyamide, polyetherimide (PEI), polyether ketone (PEK), polyphenylene sulfide (PPS), polyphenylene ether or blends thereof. The individual materials here are known, for example from H. Dominighaus, Die Kunststoffe und ihre Eigenschaften [Plastics and their properties], VDI-Verlag, Dusseldorf (1992). The substrate layer preferably comprises a molding compound of component (1), ABS, polycarbonate, polybutylene terephthalate, polyethylene terephthalate, polyamide or blends thereof. It may also consist substantially or entirely of these polymers. With particular preference the substrate layer (1') comprises a molding compound of component (1), ABS, polycarbonate or polybutylene terephthalate, especially a molding compound of component (1). It may also consist substantially or entirely of these polymers.

The layer thickness is preferably 100 to 1000 µm, in particular 200 to 500 µm.

Layer (2)

Layer (2) is a color backing layer or interlayer. One embodiment of the invention relates to a laminated sheet or film comprising a substrate layer (1) as described above, a top layer (3) and—in between them—an interlayer (2) which is composed of toughened PMMA, polycarbonate or the above-described component (1) and which contains no polycarbonate if the substrate layer (1) contains polycarbonate. If both substrate layer and interlayer either contain polycarbonate or are polycarbonate-free, then a two-layer structure is present.

The invention additionally relates to laminated sheets or films comprising (2') a layer of toughened PMMA, polycarbonate or the above component (1) and (3) a top layer of PMMA. In this case the layer (2') can have the same components as the interlayer (2). In addition, it may also correspond to component (1) containing polycarbonate.

If polycarbonate is used as interlayer (2) or as layer (2'), then it is possible to employ the polycarbonate described under component (1), component C.

Toughened PMMA (high-impact PMMA: HI-PMMA) is a polymethyl methacrylate which has been made impact-resistant by means of suitable additives. Suitable impact-modified PMMAs are described, for example, by M. Stickler, T. Rhein in Ullmann's encyclopedia of industrial chemistry Vol. A21, pages 473–486, VCH Publishers Weinheim, 1992, and by H. Domininghaus, Die Kunststoffe und ihre Eigenschaften, VDI-Verlag Düsseldorf, 1992. The interlayer (2) or the layer (2') can comprise special-effect colorants. These are, for example, dyes, metal flakes or pigments. The dyes or pigments can be organic or inorganic compounds.

The invention also relates to laminated films which between the substrate layer (1') and the transparent top layer (3') comprise (2") an interlayer of polymethyl methacrylate, high-impact polymethyl methacrylate, ABS, polycarbonate, polyethylene terephthalate, styrene-acrylonitrilecopolymers, polyamide, polyether sulfone or polysulfone, which comprises special-effect colorants, having a layer thickness of from 50 to 400, preferably from 100 to 300 $\mu$m. The interlayer (2") preferably has the same composition as the layer (2').

Layer (3)

Layer (3) of the laminated sheets or films according to the invention is a top layer of PMMA. The PMMA used preferably has a number-average molecular weight of from 40,000 to 100,000. Examples of suitable PMMA molding compositions are Lucryl® G88 or G87 from Resart/BASF, and also the compositions described in EP-A2-0 225 500.

The layer thickness of the above laminated sheets or films is preferably from 100 $\mu$m to 10 mm. Laminated sheets particularly preferably have a layer thickness of from 3 to 10 mm. Laminated films particularly preferably have a layer thickness of 100–500 $\mu$m.

In the laminated films comprising the substrate layer (1') and, if used, the interlayer (2") the transparent top layer (3') comprises polymethyl methacrylate, high-impact polymethyl methacrylate, ABS, polycarbonate, polyethylene terephalate, styrene-acrylonitrile copolymers, polyamide, polyether sulfone or polysulfone, with a layer thickness of from 10 to 100 $\mu$m.

It can also consist substantially or entirely of these polymers. The transparent top layer (3') preferably comprises polymethyl methacrylate, high-impact polymethyl methacrylate, ABS, polycarbonate, polyethylene terephthalate or styrene-acrylonitrile copolymers. In particular it comprises polymethyl methacrylate, high-impact polymethyl methacrylate or polycarbonate, especially polymethyl methacrylate or high-impact polymethyl methacrylate. It may also consist substantially or entirely of these polymers. The polymers are chosen so that they result in a transparent top layer.

Layer (0)

Layer (0) is an adhesion layer comprising an adhesion promoter having a layer thickness of from 5 to 100 $\mu$m. It can be located on the outer surface of the substrate layer. The purpose of using the adhesion promoter is to produce a firm bond with a chosen substrate which comes to lie beneath the substrate layer (for example as a result of backspraying). The adhesion layer is used when the adhesion of this other substrate to the substrate layer is inadequate (for example in the case of polyolefin substrates). The adhesion promoter employed in this case is an adhesion promoter customarily employed for this combination of materials. Examples of suitable adhesion promoters are:

ethylene-vinyl acetate copolymers for coupling to polyethylene and maleic anhydride-grafted polypropylenes for coupling to polypropylene. In both cases, adhesion is achieved by the introduction of polar groups into the apolar polyolefins.

Laminated sheets comprising a substrate layer (1), an interlayer (2) or a layer (2') and a top layer (3) preferably have the following layer thicknesses: substrate layer (1) from 3 to 9.5 mm, particularly preferably 3–7 mm, especially 3–5 mm; interlayer (2) or layer (2') from 50 to 500 $\mu$m, particularly preferably from 200 to 400 $\mu$m; top layer (3) 5–300 $\mu$m, particu-larly preferably 20–100 $\mu$m. In a particularly preferred embodiment the substrate layer (1) has a thickness of 3–4 mm, the interlayer (2) or layer (2') a thickness of 200–300 $\mu$m and the top layer (3) a thickness of 30–70 $\mu$m.

Laminated films comprising a substrate layer (1'), an interlayer (2") if used, a top layer (3') and, if used, an adhesion layer (0) preferably have the following layer thicknesses:

substrate layer (1') 90–990 $\mu$m; interlayer (2") 50–400 $\mu$m; top layer (3') 10–100 $\mu$m; adhesion layer (0) 5–100 $\mu$m. The overall thickness of the laminated film in this case is 100–1000 $\mu$m, preferably 200–800 $\mu$m.

The three-layer sheet can be produced, for example, from a laminated film having 2 layers (2') and (3) by providing it with a substrate layer (1). Production can be in accordance with the process described below. For this purpose it is advantageous for the ratio of the MFI (melt flow index) values of the individual components of the laminated sheets or films to be not more than 3:1, particularly preferably not more than 2:1. Consequently, the greatest MFI value of one of the components (0), (1), (1'), (2), (2'), (3), (3'), where present in the respective laminated sheets or films, is not more than three times, with particular preference not more than two times, the lowest MFI value. This ensures uniform flow properties of all of the components used in the laminated sheets or films. This harmonized flow behavior is particularly advantageous in the context of the production processes described below.

To protect the laminated sheets or films and moldings thereof in the course of production, transportation or processing it is possible to apply a transport protection film to the outside of the top layer (3) or (3') respectively. This film can be peeled off from the sheet or film after production, transportation or processing. The transport protection film can consist of any suitable material which can be separated from the top layer, examples being PET or polyolefin. Its layer thickness is preferably from 20 to 100 $\mu$m. The transport protection film can be extruded on directly in the course of the production of the laminated sheets or films, or is laminated on.

Processes for Producing the Laminated Sheets or Films

The laminated sheets or films according to the invention can be produced by adapter extrusion or die coextrusion of the components. Adapter or die coextrusion takes place in particular with the components—where present—(0) and/or (1) and/or (1') and/or (2)/(2')/(2") and/or (3)/(3'), the overall laminate being produced in a single-stage process.

In this case the individual components are rendered flowable in extruders and are brought into contact with one another by means of special equipment so as to give the laminated sheets or films having the layer sequence described above. For example, the components can be coextruded through a slot die. This process is explained in EP-A2-0 225 500.

In addition, they can be produced by the adapter coextrusion process as described in the conference volume of the technical conference on extrusion technology "Coextrusion von Folien", Oct. 8/9, 1996, VDI-Verlag Düsseldorf, in particular the paper by Dr. Netze. This economical process is employed for the majority of coextrusion applications.

Furthermore, the laminated sheets and films according to the invention can be produced by laminating films or sheets of the components onto one another within a heatable nip. In particular, films or sheets of components (0) and/or (1)/(1') and/or (2)/(2") and/or (3)/(3') are laminated onto one another in a heatable roll nip. In this case, films or sheets of the individual components are produced first of all. This can be done by known processes. The desired layer sequence is then produced by laying the films or sheets over one another appropriately to form an assembly which is then passed through a heatable roll nip and laminated under the action of pressure and heat to form a laminated sheet or film.

Especially in the case of the adapter coextrusion process, harmonizing the flow properties of the individual components is advantageous for the development of uniform layers within the laminated sheets or films.

The laminated sheets or films can be used to produce any desired moldings. With particular preference the laminated sheets or films are used to produce moldings for which critical properties are a very good surface, high weatherability and good UV resistance. The surfaces, moreover, are highly scratch-resistant and firmly adhering, so that destruction of the surfaces by scratching or detachment of the surfaces is reliably prevented. Consequently, moldings for use in the exterior sector, out of doors, constitute a preferred field of application. The laminated sheets or films are employed in particular for producing automotive components, especially automotive components for exterior applications within the motor vehicle sector. Examples are the production of wings, door trims, fenders, spoilers, skirts and exterior mirrors.

The laminated sheets or films according to the invention are employed with particular advantage for producing colored moldings, especially moldings for exterior applications in the automotive field.

Moldings of laminated sheets that consist of a substrate layer (1) and a top layer (3) already have the very good surface properties mentioned above. To produce colored moldings, the substrate layer and if desired the top layer can be colored with color-imparting substances such as dyes or pigments. For producing colored moldings, the use of three-layer laminated sheets is of particular advantage. In this case it is sufficient to color only the interlayer (2) or, respectively, (2') or (2"). Coloring can again be carried out with all suitable color-imparting substances (colorants). In this case the top layer serves to protect the interlayer and to provide the desired surface properties. It is not necessary to color the voluminous substrate layer, with the result that very good coloring can be achieved with a small amount of colorant. As a result, it is also possible to use expensive colorants, since their concentration can be kept low. When using HI-PMMA and polycarbonate, in particular, as the interlayer it is possible to bring about depth (flop) effects. All other kinds of special coloration are also possible, such as metallic and effect finishes.

Moldings can be produced by known processes from the laminated sheets or films. For example, laminated sheets having the three-layer structure of substrate layer, interlayer and top layer or the two-layer structure of substrate layer and top layer can be produced by thermoforming, using either positive or negative thermoforming processes. Appropriate processes are known to the skilled worker. In such processes, the laminated sheets according to the invention are stretched or drawn. Since the gloss and the surface quality of the laminated sheets according to the invention does not decrease on stretching at high draw ratios, for example up to 1:5, there are virtually no restrictions on the thermoforming processes in respect of the stretching possible.

From the laminated sheets or films composed of a layer (2') and a top layer (3) it is possible to produce moldings by thermoforming the laminated sheet or film and then backspraying (back-casting) with a component (1) or with a polyurethane foam. Thus the laminated sheet or film is first of all placed in the desired mold and then backsprayed. The films employed can also be referred to as backspraying films. By means of the thermoforming of backspraying films, followed by spraying, it is possible in particular to produce highly complex moldings. This process is also known as insert molding.

From the laminated films of the layers (0), (1') and, if used, (2") and (3') it is possible to produce moldings by backspraying or back-casting of the laminated films with component (1'), preferably ABS, PC/ASA, PC/PBT or else PP or PE in the case where an adhesion layer is used, or with a polyurethane foam, it being possible for the laminated film to be thermoformed beforehand, or by laminating a molding comprising one of the abovementioned components or a polyurethane foam with the laminated film.

The invention also relates to the moldings comprising shaped laminated sheets or films which may have been backsprayed. The moldings of the laminated sheets or films are backsprayed or back-cast with component (1') or with a polyurethane foam, or a molding of component (1') or a polyurethane foam is laminated with the laminated film.

In this case the moldings are preferably from the automotive sector, and in particular are exterior bodywork parts. They can be relatively small automotive exterior bodywork parts, such as mirrors or trim strips, but can also be exterior bodywork parts of relatively large surface area, examples being wings, hoods, covers, doors and so on. They can also be fenders or bumpers. In this case, backspraying with polyurethane has the capacity, for example, to lead to fenders or bumpers having very good impact-damping properties.

The moldings can be used in general throughout the automotive sector.

The moldings according to the invention, especially in relation to moldings in which an ABS substrate layer is used, have the following advantages:

- lower loss in toughness of the PMMA top layer when the substrate layer according to the invention (component 1) is used, in comparison to the ABS substrate
- increased scratch resistance of the PMMA layer, which is also governed by the substrate layer lying below the top layer
- effective prevention of the formation of cracks in the PMMA top layer as a result of the toughened interlayer and/or toughened substrate layer thinner PMMA top layers can be used without reducing the UV stability of the substrate layer the moldings have very good properties in respect of low-temperature impact strength, elongation at break, scratch resistance and surface gloss the laminated sheets or films can be thermoformed with retention of gloss even at very high draw ratios (especially in the positive thermoforming process)

cost-effective coloring is possible by coloring the thin interlayer depth (flop) effects can be produced in the interlayer, especially when it comprises HI-PMMA or polycarbonate cost-effective production by the adapter coextrusion process is possible, especially when the components selected have similar flow properties even highly viscous and scratch-resistant PMMA grades can be coextruded with other highly viscous components moldings comprising polycarbonates in the substrate layer are highly resistant to thermal deformation and are particularly impact resistant no solvents are used in coloring with the laminated films.

The invention is illustrated in more detail below with reference to examples.

In the examples, coextruded sheets were employed in which the substrate layer was 3.7 mm thick. The interlayer, where used, had a thickness of 0.25 mm. The thickness of the top layer was 0.05 mm.

In these sheets various materials were employed, such as PMMA, ABS, HI-PMMA and component (1). Component (1) without polycarbonate consisted of a particulate graft copolymer having a graft base composed of n-butyl acrylate and a crosslinker, and a graft comprising styrene and acrylonitrile units. The graft copolymer was in a matrix comprising a styrene-acrylonitrile copolymer. In addition, component (1) was also employed with a proportion of polycarbonate as a further matrix component.

The values indicated below, as percentages based on the substrate values, were found for the reduction in the penetration energy as a result of applying the PMMA layers. Both the top face and the rear face of the coextruded sheets were tested by impact. The results are summarized in Table 1.

TABLE 1

Change in the penetration energy as a result of PMMA layers, value in %, based on the penetration energy of the substrate

| Sheet made of | Top face | Rear face |
| --- | --- | --- |
| PMMA/HI-PMMA/component (1) with polycarbonate | 70 | 51 |
| PMMA/component (1)/component (1) with polycarbonate | 102 | 62 |
| PMMA/polycarbonate/component (1) with polycarbonate | 84 | 50 |
| PMMA/ABS | 54 | 52 |

The results of Table 1 show that the sheets according to the invention have a penetration energy which is either greater than or only slightly less than that of the substrates, comparison being with the sheets based on ABS.

The low-temperature impact strength of corresponding coextruded sheets was also investigated. The penetration energy was determined at −30° C., with the results shown in Table 2 below.

TABLE 2

| Sheet made of | Penetration energy [Nm] - 30° C. |
| --- | --- |
| PMMA/HI-PMMA/component (1) with polycarbonate | 21.3 |
| PMMA/component (1)/component (1) with polycarbonate | 26.3 |
| PMMA/polycarbonate/component (1) with polycarbonate | 31.7 |
| PMMA/component (1) | 10.6 |
| PMMA/ABS | 6.3 |

The results of Table 2 show that the sheets according to the invention have a markedly higher penetration energy than the known sheets having ABS as substrate. The three-layer structure in particular leads to substantially higher low-temperature impact strengths.

A measurement was also made of the elongation at break under tensile/flexural loading. In this case the elongation at break was determined in the lengthwise (I) and crosswise (c) directions relative to the original direction of extrusion of the sheets. The results are given in Table 3 below.

TABLE 3

| Sheet made of | Elongation at break [%] l | Elongation at break [%] c |
| --- | --- | --- |
| PMMA/HI-PMMA/component (1) with polycarbonate | 5.9 | 4.3 |
| PMMA/polycarbonate/component (1) with polycarbonate | 34.7 | 21.3 |
| PMMA/component (1)/component (1) with polycarbonate | 8.1 | 8.1 |
| PMMA/ABS | 4.6 | 3.8 |

The results of Table 3 show that the elongation at break for the sheets according to the invention is substantially higher than for the comparison sheet.

The scratch resistance of the novel laminated films was also investigated, as follows:

using a scratch tester, each test sheet was marked with 10 scratches each 6 m in length at a distance of 1 mm from each other. This was done by moving a diamond tip with an acute angle of 120 degrees and a radius of 0.2 mm over the sample under a force of 2.6 N. Subsequently, the surface topography normal to the direction of scratching was measured using a mechanical scanner (commercial Hommel tester). The depth of the marks, measured relative to the surface of the sample, is regarded as a measure of the scratch resistance.

The measurements were made at room temperature, with the results indicated in Table 4 below:

TABLE 4

| Laminated films | Scratch depth |
| --- | --- |
| PMMA/HI-PMMA (50 μm/250 μm) | 0.5 μm |
| PMMA/ASA (50 μm/450 μm) | 2.7 μm |
| PVDF film | 5.5 μm |

The results of Table 4 show that the scratch resistance for the laminated films according to the invention is substantially higher than for the PVDF film commonly employed.

In addition, the surface gloss before and after weathering was measured, in accordance with DIN 67530. The results are indicated in Table 5 below.

TABLE 5

| Sheet made of | unweathered | after 500 h |
|---|---|---|
| PMMA/MI-PMMA/component | 81.1 | 84.1 |
| PMMA/component (1) | 79.7 | 85.4 |
| ABS | 56.5 | 49.5 |
| Component (1) | 78.1 | 69.6 |

The results of Table 5 show that the sheets according to the invention exhibit a substantially better surface gloss than the sheets which do not have a top layer of PMMA.

We claim:

1. A process for producing a UV-stable laminated structure having thermal aging resistance, which process comprises coextruding the following layers in a single-stage operation:

a substrate layer comprising—based on the sum of the amounts of the following components A and B and, if used, C and/or D, which totals 100% by weight—
1–99% by weight component A, which is of a graft copolymer of 1–99% by weight of a particulate graft base A1 comprising the following monomers:
80–99.99% by weight of at least one $C_{1-8}$-alkyl ester of acrylic acid as component A11;
0.01–20% by weight of at least one polyfunctional crosslinking monomer as component A12;
1–99% by weight of a graft A2 comprising the following monomers based on A2;
40–100% by weight of units of styrene, a substituted styrene or a (meth)acrylate, or mixtures thereof, as component A21 and up to 60% by weight of units of acrylonitrile or methacrylonitrile as component A22; the graft A2 comprising at least one graft shell and the graft copolymer having a mean particle size of 50–1000 nm;
1–99% by weight of component B, which is a copolymer of 40–100% by weight of units of styrene, a substituted styrene or a (meth)acrylate, or mixtures thereof, as component B1, and up to 60% by weight of acrylonitrile or methacrylonitrile as component B2;
0–80% by weight of component C, which is a polycarbonate: and
0–50% by weight of component D, which is a fibrous or particulate filler or mixtures thereof; and
a transparent top layer of polymethyl methacrylate, followed by thermoforming said UV-stable laminated structure to produce a molding, followed by backspraying or back-casting the molding with the material of said substrate layer or with a polyurethane foam or laminating said substrate material layer or polyurethane foam onto said molding.

2. The process of claim 1, which process additionally comprises coextruding between the transparent top layer and the substrate layer, an interlayer of impact-modified polymethyl methacrylate, polycarbonate or a molding composition of the substrate layer as set forth in claim 1 without a polycarbonate.

3. The process of claim 2, which process comprises employing adapter coextrusion to coextrude the recited layers in said single-stage operation.

4. The process of claim 2, which process comprises employing die coextrusion to coextrude the recited layers in said single-stage operation.

5. A process which comprises coextruding the following layers in a single stage operation:

a substrate layer comprising a member selected from the group consisting of:
a composition comprising components A and B, and optionally C and D, as defined as follows:
1-99% by weight component A, which is of a graft copolymer of 1-99% by weight of a particulate graft base A1 comprising the following monomers:
80-99.99% by weight of at least one $C_{1-8}$-alkyl ester of acrylic acid as component A11;
0.01-20% by weight of at least one polyfunctional crosslinking monomer as component A12;
1-99% by weight of a graft A2 comprising the following monomers based on A2;
40-100% by weight of units of styrene, a substituted styrene or a (meth)acrylate, or mixtures thereof, as component A21 and up to 60% by weight of units of acrylonitrile or methacrylonitrile as component A22;
the graft A2 comprising at least one graft shell and the graft copolymer having a mean particle size of 50-1000 nm;
1-99% by weight of component B, which is a copolymer of 40-100% by weight of units of styrene, a substituted styrene or a (meth)acrylate, or mixtures thereof, as component B1, and up to 60% by weight of crylonitrile or methacrylonitrile as component B2;
0-80% by weight of component C, which is a polycarbonate; and
0-50% by weight of component D, which is a fibrous or particulate filler or mixtures thereof; ABS; polycarbonate; polybutylene terephthalate; polyethylene terephthalate; polyamide, polyetherimide; polyether ketone; polyphenylene sulfide; and polyphenylene ether or blends thereof; the substrate layer having a layer thickness of from 90 to 990 μm; and
a transparent top layer comprising a member selected from the group consisting of: polymethyl methacrylate; high-impact polymethyl methacrylate; ABS; polycarbonate; polyethylene terephthalate; styrene-acrylonitrile copolymers: polyamide; and polyether sulfone or polysulfone; the transparent top layer having a layer thickness of from 10 to 100 μm; the substrate layer comprising special- effect colorants if the substrate layer and the transparent top layer comprise polyamide, the overall thickness of the laminated structure being from 100 to 1000 μm.

6. The process of claim 5, which process additionally comprises coextruding between the transparent top layer and the substrate layer an interlayer of a member selected from the group consisting of polymethyl methacrylate; high-impact polymethyl methacrylate; ABS; polycarbonate; polyethylene terephthalate; styrene-acrylonitrile copolymers; polyamide; polyether sulfone or polysulfone; the interlayer comprising special-effect colorants and having a layer thickness of from 50 to 400 μm.

7. The process of claim 6, which process additionally comprises coextruding on the outer surface of the substrate layer
an adhesion layer comprising an adhesion promoter and having a layer thickness of from about 5 to about 100 μm.

8. The process of claim 1, which process additionally comprises applying a transport protection film to the outside of the transparent top layer.

9. The process of claim 1, which process comprises employing adapter coextrusion to coextrude the recited layers in said single-stage operation.

10. The process of claim 1, which process comprises employing die coextrusion to coextrude the recited layers in said single-stage operation.

11. A process for producing a UV-stable laminated structure having thermal aging resistance, which process comprises laminating the following layers onto one another in a heatable roll nip:

a substrate layer comprising—based on the sum of the amounts of the following components A and B and, if used, C and/or D, which totals 100% by weight—
1–99% by weight component A, which is of a graft copolymer of 1–99% by weight of a particulate graft base A1 comprising the following monomers:
80–99.99% by weight of at least one $C_{1-8}$-alkyl ester of acrylic acid as component A11;
0.01–20% by weight of at least one polyfunctional crosslinking monomer as component A12;
1–99% by weight of a graft A2 comprising the following monomers based on A2;
40–100% by weight of units of styrene, a substituted styrene or a (meth)acrylate, or mixtures thereof, as component A21 and up to 60% by weight of units of acrylonitrile or methacrylonitrile as component A22;
the graft A2 comprising at least one graft shell and the graft copolymer having a mean particle size of 50–1000 nm;
1–99% by weight of component B, which is a copolymer of 40–100% by weight of units of styrene, a substituted styrene or a (meth)acrylate, or mixtures thereof, as component B1, and up to 60% by weight of acrylonitrile or methacrylonitrile as component B2;
0–80% by weight of component C, which is a polycarbonate; and
0–50% by weight of component D, which is a fibrous or particulate filler or mixtures thereof; and a transparent top layer of polymethyl methacrylate, followed by thermoforming said UV-stable laminated structure to produce a molding, followed by backspraying or back-casting the molding with the material of said substrate layer or with a polyurethane foam or laminating said substrate material layer or polyurethane foam onto said molding.

12. The process of claim 11, which process additionally comprises coextruding between the transparent top layer and the substrate layer, an interlayer of impact-modified polymethyl methacrylate, polycarbonate or a molding composition of the substrate layer as set forth in claim 11 without a polycarbonate.

13. The process of claim 11, which process additionally comprises applying a transport protection film to the outside of the transparent top layer.

14. A process which comprises laminating the following layers onto one another in a heatable roll nip:

a substrate layer comprising a member selected from the group consisting of a composition comprising:
components A and B and optionally C and D, defined as follows:
1-99% by weight component A, which is of a graft copolymer of 1-99% by weight of a particulate graft base A1 comprising the following monomers:
80-99.99% by weight of at least one $C_{1-8}$-alkyl ester of acrylic acid as component A11;
0.01-20% by weight of at least one polyfunctional crosslinking monomer as component A12;
1-99% by weight of a graft A2 comprising the following monomers based on A2;
40-100% by weight of units of styrene, a substituted styrene or a (meth)acrylate, or mixtures thereof, as component A21 and up to 60% by weight of units of acrylonitrile or methacrylonitrile as component A22;
the graft A2 comprising at least one graft shell and the graft copolymer having a mean particle size of 50-1000 nm:
1-99% by weight of component B, which is a copolymer of 40-100% by weight of units of styrene, a substituted styrene or a (meth)acrylate, or mixtures thereof, as component B1, and up to 60% by weight of acrylonitrile or methacrylonitrile as component B2;
0-80% by weight of component C, which is a polycarbonate; and
0-50% by weight of component D, which is a fibrous or particulate filler or mixtures thereof; ABS; polycarbonate, polybutylene terephthalate; polyethylene terephthalate; polyamide; polyetherimide; polyether ketone; polyphenylene sulfide; and polyphenylene ether or blends thereof; the substrate layer having a layer thickness of from 90 to 900 µm; and a transparent top layer comprising a member selected from the group consisting of: polymethyl methacrylate; high-impact polymethyl methacrylate; ABS; polycarbonate; polythylene terephthalate; styrene- acrylonitrile copolymers; polyamide; and polyether sulfone or polysulfone;
the transparent top layer having a layer thickness of from 10 to 100 µm; the substrate layer comprising special-effect colorants if the substrate layer and the transparent top layer comprise polyamide; the overall thickness of the laminated structure being from 100 to 1000 µm.

15. The process of claim 14, which process additionally comprises laminating between the transparent top layer and the substrate layer an interlayer of a member of the group consisting of polymethyl methacrylate; high-impact polymethyl methacrylate; ABS; polycarbonate; polyethylene terephthalate; styrene-acrylonitrile copolymers; polyamide; polyether sulfone or polysulfone; the interlayer comprising special-effect colorants and having a layer thickness of from 50 to 400 µm.

16. The process of claim 15, which process additionally comprises laminating on the outer surface of the substrate layer an adhesion layer comprising an adhesion promoter and having a layer thickness of from about 5 to about 100 µm.

* * * * *